April 21, 1959     A. J. McGARRAGHY ET AL     2,882,639
FISH HOOK
Filed Jan. 24, 1957     2 Sheets-Sheet 1
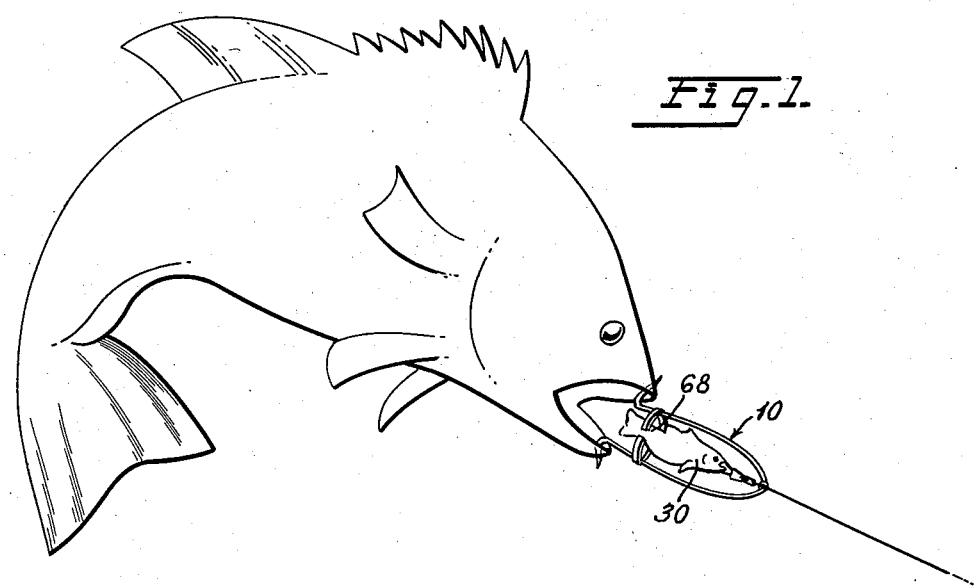
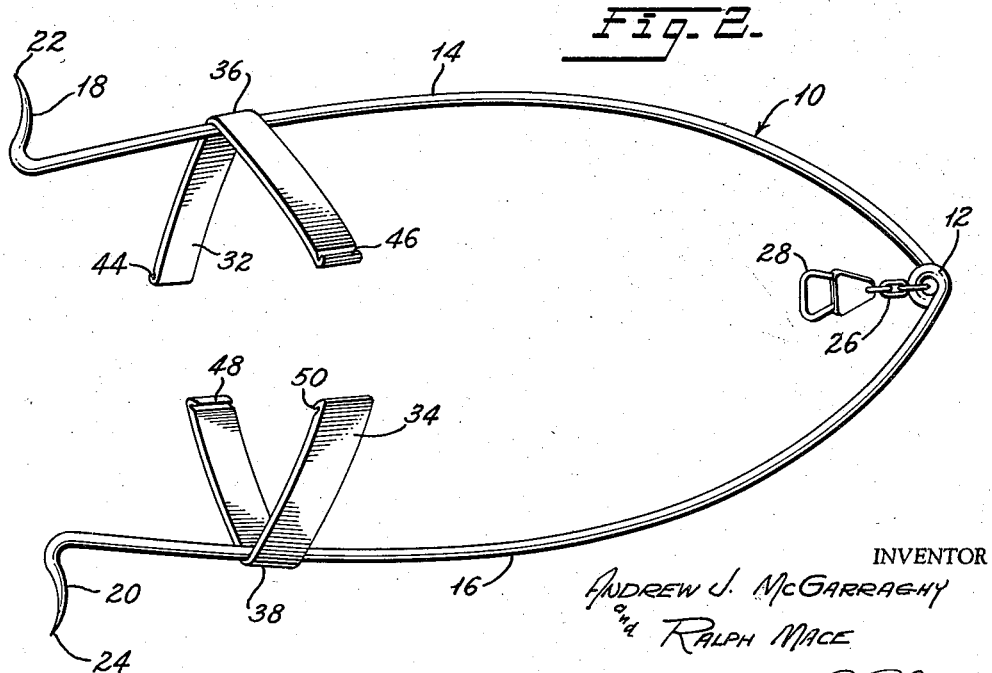
INVENTOR
Andrew J. McGarraghy
and Ralph Mace
BY Diggins & LeBlanc
ATTORNEYS April 21, 1959  A. J. McGARRAGHY ET AL  2,882,639
FISH HOOK
Filed Jan. 24, 1957  2 Sheets-Sheet 2
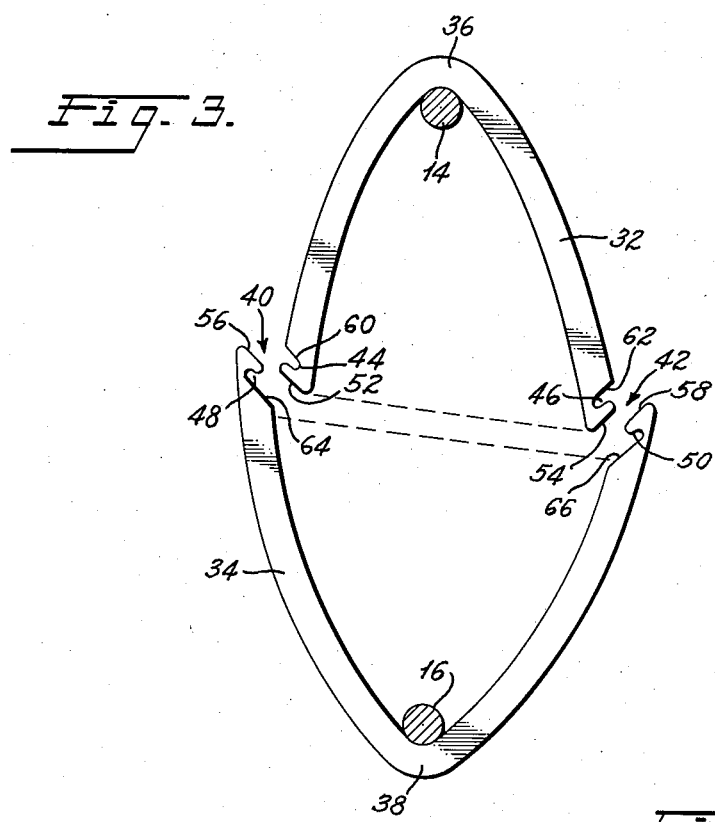
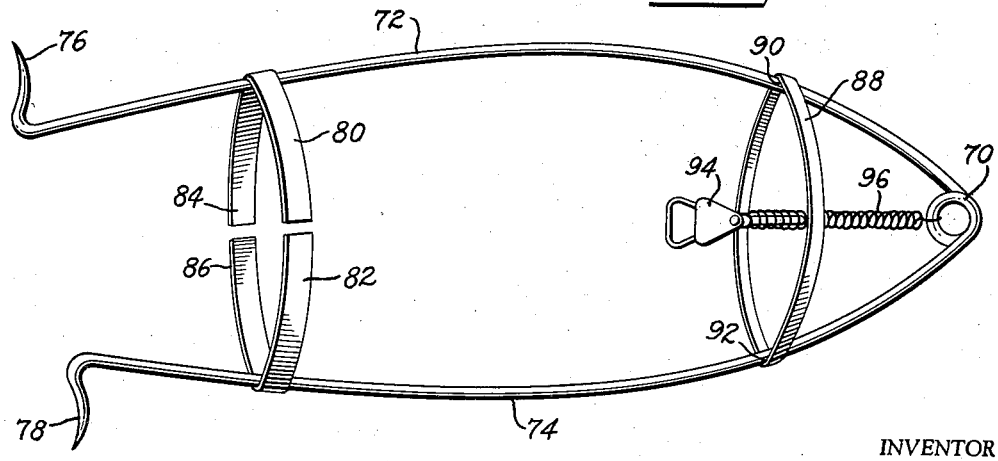
INVENTOR
ANDREW J. McGARRAGHY
RALPH MACE
BY Diggins & LeBlanc
ATTORNEYS

United States Patent Office 2,882,639
Patented Apr. 21, 1959

2,882,639

FISH HOOK

Andrew J. McGarraghy and Ralph Mace,
Saranac Lake, N.Y.

Application January 24, 1957, Serial No. 636,184

2 Claims. (Cl. 43—44.2)

This invention relates to fish hooks and more particularly relates to a fish hook which may be removed without injuring the fish.

A high percentage of fish caught and released are permanently injured by the hook and die as a result. Thus, despite the fact that fishermen comply with the conservation laws the purpose of the laws is largely thwarted.

It is accordingly a primary object of the present invention to provide a fish hook which may be removed from the mouth of the fish without doing damage.

It is another object of the invention to provide a fish hook of the foregoing type which is simple and economical.

It is another object of the invention to provide a fish hook of the foregoing type which is rugged in nature and which may be used over and over.

It is still a further object of the invention to provide a fish hook which permits repeated use of the same bait.

These and further objects and advantages of the invention will become apparent upon reference to the following specification and claims and appended drawings wherein:

Figure 1 is a perspective view showing a fish impaled upon a fish hook constructed according to the invention.

Figure 2 is a side elevation showing one embodiment of a fish hook according to the invention;

Figure 3 is a vertical section through the fish hook of Figure 2 showing the girdle arrangement;

Figure 4 is a side elevation of a fish hook according to another embodiment of the invention;

Referring to Figure 2 there is shown a fish hook 10 consisting of a coil spring 12 having bowed spring arms 14 and 16 which terminate in upwardly and downwardly bent hooks 18 and 20. The hooks 18 and 20 have smooth unbarbed surfaces but are generally bowed in shape and possessed of pointed ends 22 and 24. The bowed shape of hooks 18 and 20 causes them to join the spring arms 14 and 16 at an angle of slightly less than 90° to provide for reliable hooking of the fish.

Attached to coil spring 12 by means of a chain or similar attachment 26 is a snap hook 28 for fastening a bait fish 30, shown in Figure 1. Attached to the rear end of the bowed springs 14 and 16 are a pair of girdle straps or wires 32 and 34 which have bight portions 36 and 38 fastened to the bowed springs in any suitable manner, such as by welding. The ends of the girdle straps 32 and 34 are provided with tongue and groove connections 40 and 42. Thus the upper girdle strap 32 is provided with grooves 44 and 46 and the lower girdle strap 34 is provided with grooves 48 and 50. The outermost faces 52, 54, 56 and 58 of the ends of the girdle straps are at an acute angle to the longitudinal axes or to the outer surfaces of the girdle straps, and the innermost surfaces 60, 62, 64 and 66 are at an acute angle with the inner surfaces of the girdle straps or with the longitudinal axes thereof. The arms of girdle 34 are normally exterior to the corresponding arms of girdle 32 as shown in the unrestrained position of Figure 3.

When the fish hook of the invention is assembled with a bait fish on the snap hook 28, the rear end 68 of the bait fish extends between the girdle straps to provide protection for the bait fish and to prevent the bait fish from oscillating from between the hooks 18 and 20 so that a fish could remove the bait without actuating the hook. When the tongue and groove joints in the girdle straps are engaged together by compressing the arms of girdle 34 toward the corresponding arm of girdle 32 and bow springs 14 and 16 are placed under tension they hold the girdle straps in hooked engagement. When, however, a fish takes the hook and bites down upon hooks 18 and 20, the inclined surfaces of the tongue and groove joints force the tongue and groove joints open releasing the girdles 32 and 34 to allow them to spring to their unrestrained position and permit bow springs 14 and 16 to snap hooks 18 and 20 apart and into hooking engagement with the mouth of the fish as shown in Figure 1. The hook may be removed from the mouth of the fish by merely compressing bow springs 14 and 16 and, since hooks 18 and 20 are not barbed, no damage is done to the fish. In most instances the bait fish 30 remains undamaged after hooking a fish in this manner and consequently can be used again.

Referring to Figure 4 there is shown another embodiment of my invention similar to that shown in Figures 1 through 3 but which utilizes a different means of setting the hook. According to this embodiment of my invention a coil spring 70 having bowed spring arms 72 and 74 is provided with hooks 76 and 78. Attached to the rear end of bowed spring arms 72 and 74 are a pair of girdle straps or wires 80 and 82 which protect the rear end of the bait fish. In this embodiment of the invention, however, the girdle straps or wires are not provided with tongue and groove joints but have ends 84 and 86 which are spaced when the hook of the invention is in a latched position. As in the preceding embodiment of the invention a bait fish snap hook 94 is attached to the coil spring 70 by means of a coil spring 96. Latching of this type hook is accomplished by means of a latch ring 88 which fits over the front end of the bowed spring arms 72 and 74 and which is engaged in grooves 90 and 92 in the spring arms 72 and 74. When a fish takes the hook and bites down upon hooks 76 and 78, spring arms 72 and 74 are compressed together releasing latch ring 88 from grooves 90 and 92 and thereby permitting hooks 76 and 78 to spring into engagement with the mouth of the fish.

It will be apparent from the foregoing that a fish hook constructed according to my invention may be removed from the mouth of a fish in a very simple manner without doing damage to the fish. The hook is simple in construction, utilizes a minimum number of parts, and is so constructed that it is normally possible to use the bait fish a number of times.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fish hook comprising a generally U-shaped spring having a pair of spring arms extending from a bight portion, means for attaching bait to said bight portion, unbarbed hooks attached to the ends of said arms extending outwardly and slightly rearwardly toward said bight portion, a pair of generally U-shaped girdle members having their bight portions attached to opposite portions of said arms and having arm portions extending toward one another, one pair of arms on one of said girdle members being exterior of the corresponding arms on the other girdle member in the unrestrained position, and releasable locking means pre-set by flexing said spring arms toward one another and corresponding arms of said girdle members toward one another, said releasable locking means provided with interengaging tongue and groove joints on the ends of the arm portions of said girdle members to lock said spring arms in position until said spring arms are further flexed toward one another whereby said one pair of arms expands to its unrestrained position to permit said spring arms to separate.

2. A fish hook as set out in claim 1 in which the outer ends of said arm portions of said girdle members are at an acute angle to the axes of said arm portions and mate with similarly disposed surfaces in the grooves in said arm portions.

References Cited in the file of this patent
UNITED STATES PATENTS

| | | |
|---|---|---|
| 580,915 | Welch | Apr. 20, 1897 |
| 684,211 | Ferch | Oct. 8, 1901 |
| 1,591,640 | Middleton | July 6, 1926 |
| 1,745,169 | Johnson | Jan. 28, 1930 |
| 2,148,074 | Kaspick | Feb. 21, 1939 |
| 2,570,468 | Mathes | Oct. 9, 1951 |
| 2,608,786 | Schwartz | Sept. 2, 1952 |

FOREIGN PATENTS

| | | |
|---|---|---|
| 432,262 | France | Sept. 30, 1911 |
| 749,308 | France | July 22, 1933 |